United States Patent
Church et al.

[11] 3,854,765
[45] Dec. 17, 1974

[54] HEAVY-DUTY VEHICLE BUMPER MOUNT CONSTRUCTION

[75] Inventors: Herman S. Church, Cuyahoga Falls; James L. Hagener, Canton; Zach M. Scifres, III, Hartville, all of Ohio

[73] Assignee: Teledyne Mid-America Corporation, Hartville, Ohio

[22] Filed: Apr. 26, 1973

[21] Appl. No.: 354,485

[52] U.S. Cl. ................................. 293/88, 293/86
[51] Int. Cl. ............................................ B60r 19/06
[58] Field of Search .................... 293/85, 86, 88, 89

[56] References Cited
UNITED STATES PATENTS

| | | | |
|---|---|---|---|
| 458,532 | 8/1891 | Green | 293/85 |
| 959,232 | 5/1910 | Lane | 293/85 |
| 2,035,809 | 3/1936 | Hingst | 293/89 |
| 3,722,939 | 3/1973 | Church et al. | 293/88 |
| 3,747,969 | 7/1973 | Diener | 293/89 |

*Primary Examiner*—M. Henson Wood, Jr.
*Assistant Examiner*—Robert Saifer
*Attorney, Agent, or Firm*—Frease & Bishop

[57] ABSTRACT

A vehicle bumper mount construction formed of a generally elongated box-like housing member enclosing a portion of an elongated beam member generally H-shaped in cross-section. Pairs of rubber pads having parallel surfaces are bonded one surface to the web of the H-beam member on either side thereof. The other pads surfaces are secured to the side walls of the housing. The housing member is provided with bolts for mounting the assembly on a vehicle, and the H-beam is provided with a mounting flange for attaching the vehicle bumper to the assembly. An anti-pull-out pin extends transversely through the housing side walls and through a longitudinal slot formed in the web of the H-beam member to prevent the beam and rubber pads from being pulled out of the housing when a pull such as a towing force is applied to the bumper. Ramp formations are formed on the rear end portions of the H-beam. The rubber pads are pre-stressed or pre-loaded to hold the anti-pull-out pin engaged with the H-beam at the rear of the beam slot in the at-rest or normal position and to hold the ramp formations in engagement with the rear end of the housing preventing rattle between the H-beam and housing. Impact energy applied to the bumper is absorbed by delfection of the H-beam placing shear stress on the rubber pads with the beam moving along the anti-pull-out pin which engages the front of the beam slot upon reaching fully loaded position.

4 Claims, 10 Drawing Figures

PATENTED DEC 17 1974 3,854,765
SHEET 1 OF 3
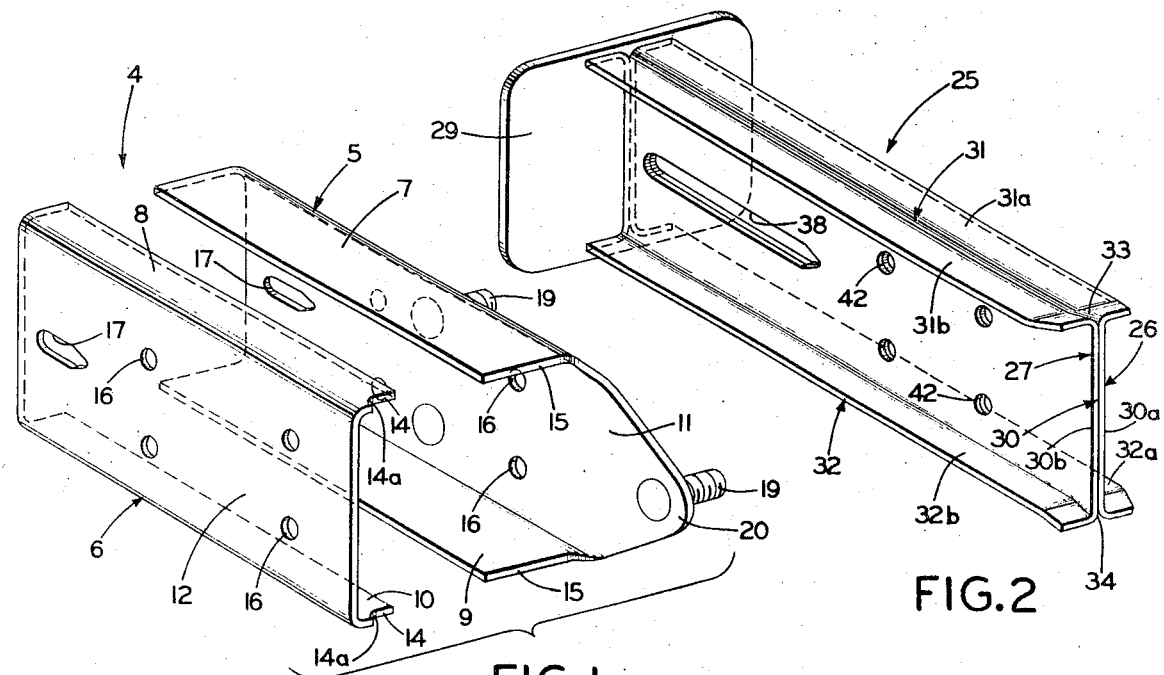
FIG.1
FIG.2
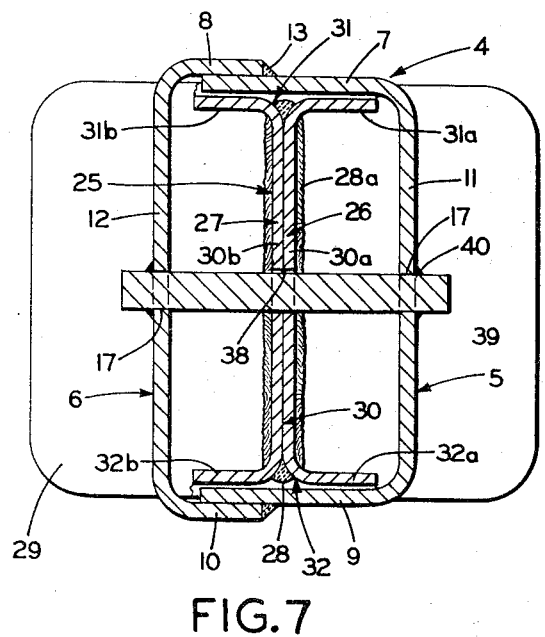
FIG.7
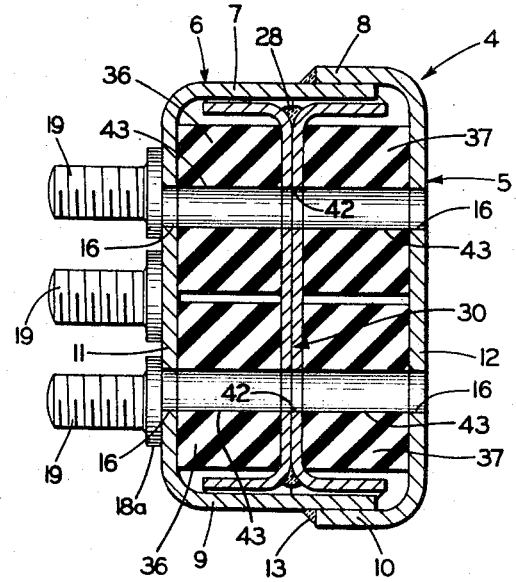
FIG.8

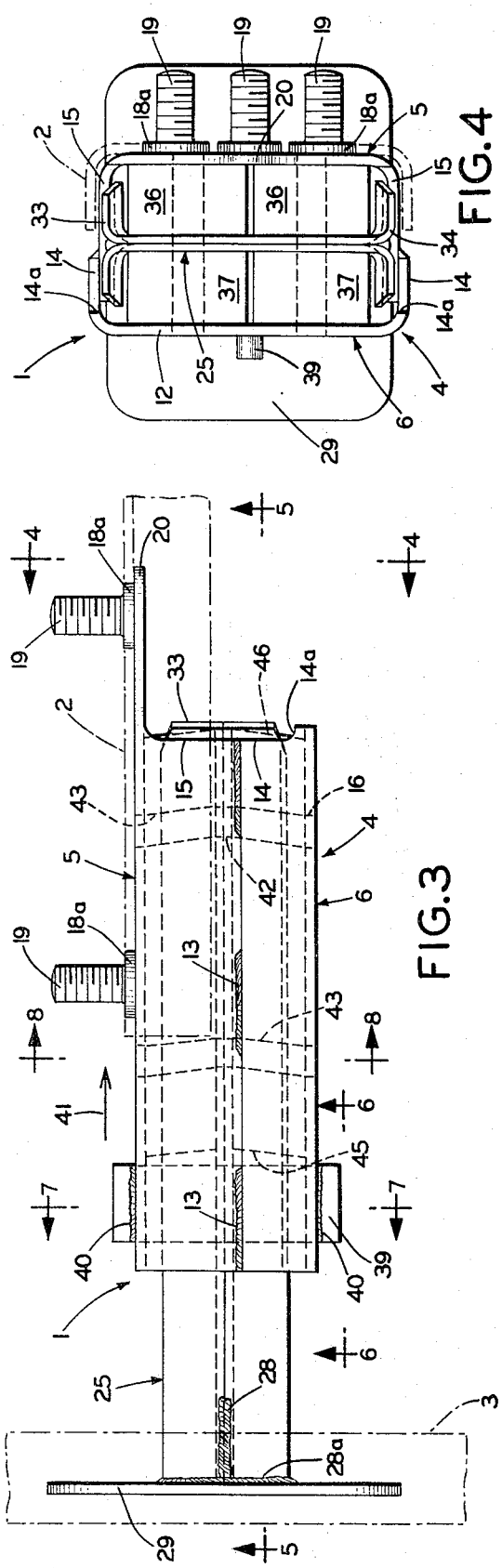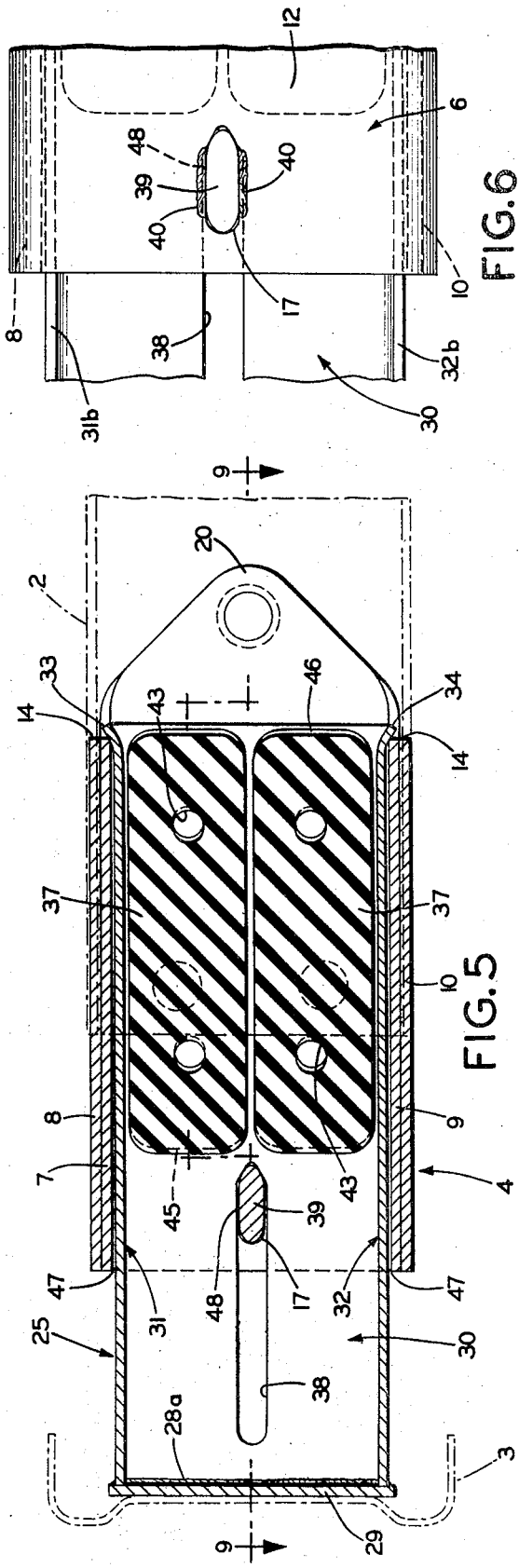

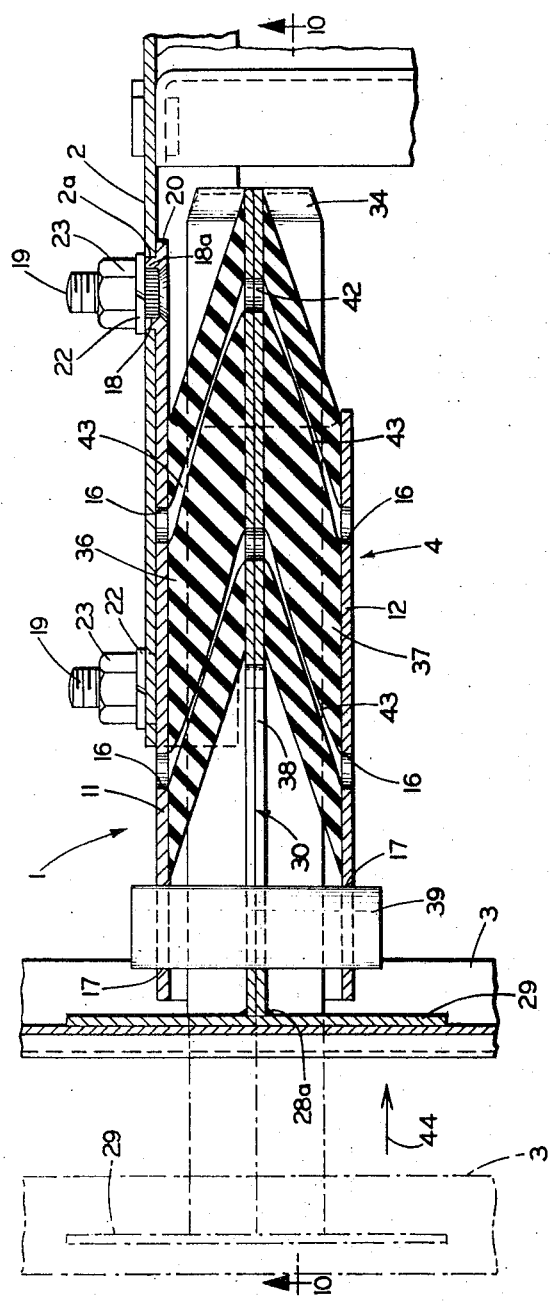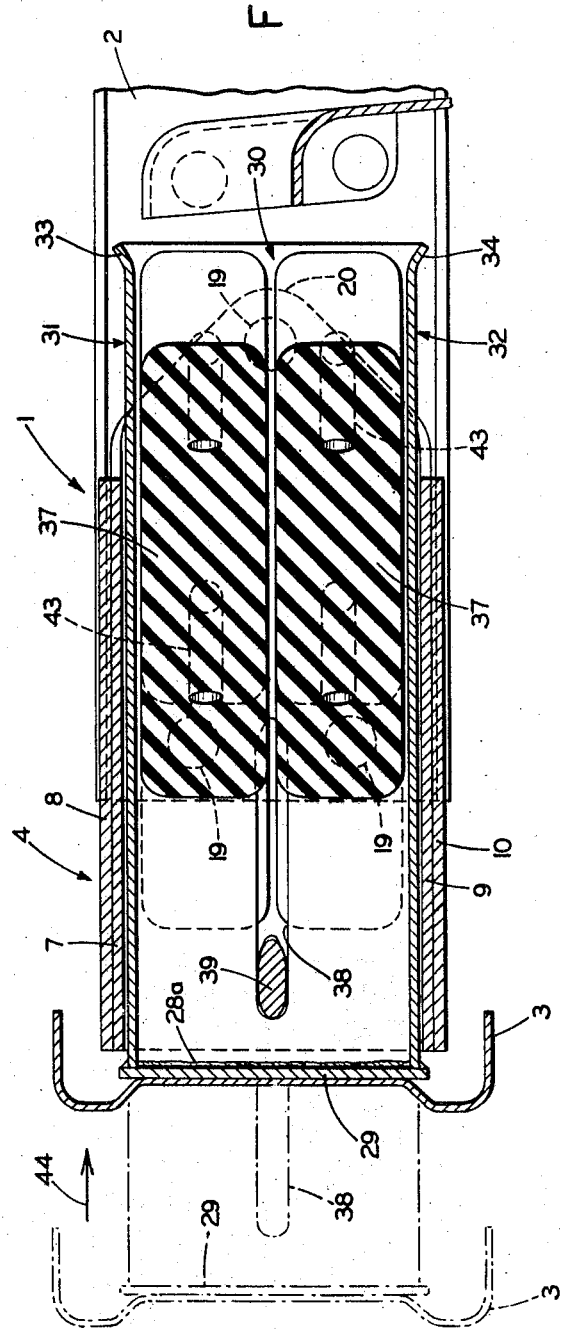

HEAVY-DUTY VEHICLE BUMPER MOUNT CONSTRUCTION

CROSS-REFERENCE TO RELATED PATENTS AND APPLICATIONS

The invention involves improvements in the bumper construction shown and described in U.S. Pat. No. 3,722,939 and in copending application Ser. No. 290,484 filed Sept. 20, 1972 now U.S. Pat. No. 3,804,445.

BACKGROUND OF THE INVENTION

1. Field of the Invention

The invention relates to vehicle bumper mount constructions of the energy absorbing type and particularly to heavy-duty energy absorbing vehicle bumper mounts for use on extremely heavy vehicles such as motor homes, etc., which bumper mounts employ rubber in shear as the energy absorbing medium. More particularly the invention relates to energy absorbing bumper mounts having retaining pin means which prevents pull-out of components of the bumper mounting means, when pull such as a towing force is applied to the bumper of such heavy vehicles.

2. Description of the Prior Art

The construction shown and described in U.S. Pat. No. 3,722,939 and in copending application Ser. No. 290,484 involve bumper mount constructions that absorb, without vehicle damage, impact energy of low velocity vehicle collisions without sacrificing convenience or safety features of an automobile. One form of construction shown in U.S. Pat. No. 3,722,939 involves outturned ears on the movable beam which engage the rear end of the housing to transmit a towing load directly from the bumper through the housing to the frame of a vehicle when a towing load is secured to the bumper which pulls the forward end of the beam from the housing until the beam ears engage the rear end of the housing. This construction is undesirable from the standpoint of rattling and because of a concentration of the towing load at small sheet metal edge engagement areas between the edges of ears and the rear end edges of the housing.

Furthermore, this prior construction when towing a load from a rear bumper or when the car itself is towed from its front bumper, may develop side sway oscillation at certain vehicle towing speeds. Similarly, resonant frequency oscillation of the bumper itself may develop during vehicle travel when an otherwise satisfactory prior bumper mount construction is used.

The construction shown in copending application Ser. No. 290,484 involves ramp-like formations at the ends of the housing which engage similar ramp-like portions on the beam to absorb any towing forces and prevent pull-out of bumper components. This construction is satisfactory for relatively light vehicles such as automobiles having a weight in the range of 4 to 5 thousand pounds. However, these ramp formations as well as the outturned beam ears of U.S. Pat. No. 3,722,939, are not as strong as is desirable for extremely heavy vehicles such as self-contained vacation-type motor homes weighing approximately 15,000 pounds.

Accordingly, a need exists for a heavy-duty energy absorbing rubber bumper mount construction having the outstanding, favorable and beneficial characteristics of the constructions shown in said U.S. Pat. No. 3,722,939 and in said copending application Ser. No. 290,484, while avoiding undesirable features that are present in these prior bumper mount constructions. Furthermore, a need exists for a heavy-duty energy absorbing type bumper mount construction for extremely heavy road vehicles which can accommodate greater towing forces than prior energy absorbing bumper mount constructions, which provides a positive engagement between the moving beam member and the stationary outer housing to prevent pull-out of the beam member from the housing under extremely large pulling forces yet which permits complete freedom of movement of the beam within the housing upon absorbing contact energy, and which prevents rattle between the housing and beam member.

SUMMARY OF THE INVENTION

Objectives of the invention include providing a heavy-duty vehicle bumper mount construction wherein a towing pull or load may be applied to the bumper and in which a generally boxlike housing member relatively movably encloses a generally H-shaped elongated beam with energy absorbing rubber pads between and fixed to the housing and beam and with retaining pin means extending transversely between the housing side walls and through an elongated longitudinally extending slot formed in the web of the H-shaped beam to prevent pull-out separation of the beam from the housing; providing ramp-like formations on the rear end portions of the beam which are engageable with the rear edges of the housing in no-load condition to prevent rattle between the housing and beam; providing a construction avoiding pull-out and having anti-rattle formations in which the energy absorbing rubber pads are prestressed or preloaded to hold the retaining pin in contact with the beam at the rear end of the slot and to hold the ramp formations engaged with the housing in the no-load or normal position to prevent pull-out and rattle; providing a construction which combines the described favorable characteristics, which does not sacrifice other convenience or safety features of the vehicle, and which is adapted for use in a wide variety of models and styles of commercially made automobiles and in particular for use in heavy vehicles such as motor homes; and providing a construction which is rugged, has simple stamped metal components, which is easily and economically manufactured without undue cost elements as compared with rigid type mounting constructions, and which satisfies the foregoing objectives.

These objectives and advantages may be obtained by the heavy-duty bumper mount construction, the general nature of which may be stated as including in bumper mounting means of a type including an elongated housing having top and bottom walls and opposite side walls and open at front and rear ends; an elongated beam of generally H-shaped cross section located within the housing, and having a web portion spaced between the opposite side walls, and top and bottom flanges spaced closely adjacent to the housing top and bottom walls respectively, a front portion of the beam extending outward from the housing interior from the front open end of the housing, the rear end of the beam being located adjacent the rear open end of the housing; and energy absorbing elastic members bonded to opposite surfaces of the web and connected to the housing side walls to hold the beam within the housing;

the combination of longitudinally extending slot means formed in the H-beam web portion; pin means extending transversely between the housing side walls and through the slot means and engageable with the H-beam preventing the H-beam from being pulled out of the front end of the housing; ramp formations at the rear portion of the H-beam; and the energy absorbing elastic members being prestressed to hold the ramp formations in engagement with the rear portion of the housing and to hold the pin means engaged with the H-beam web portion at the rear of the slot means to prevent rattle.

BRIEF DESCRIPTION OF THE DRAWINGS

A preferred embodiment of the invention — illustrative of the best mode in which applicants have contemplated applying the principles — is set forth in the following description and shown in the drawings and is particularly and distinctly pointed out and set forth in the appended claims.

FIG. 1 is an exploded perspective view of components of the outer box-like housing of the improved heavy-duty bumper mount construction;

FIG. 2 is a perspective view of the H-shaped beam member which is assembled within the bumper housing of FIG. 1;

FIG. 3 is a top plan view of the assembled bumper mount construction with portions of a vehicle being shown in dot-dash lines;

FIG. 4 is an end elevation looking in the direction of arrows 4—4, FIG. 3;

FIG. 5 is a longitudinal sectional view taken on line 5—5, FIG. 3;

FIG. 6 is an enlarged fragmentary elevational view looking in the direction of arrows 6—6, FIG. 3;

FIG. 7 is an enlarged sectional view taken on line 7—7, FIG. 3;

FIG. 8 is an enlarged sectional view taken on line 8—8, FIG. 3;

FIG. 9 is a longitudinal sectional view taken on line 9—9, FIG. 5 showing in full line the position of the bumper components under impact condition; and FIG. 10 is a sectional view taken on line 10—10, FIG. 9 showing in full line the position of the bumper components under impact condition.

Similar numerals refer to similar parts throughout the drawings.

DESCRIPTION OF THE PREFERRED EMBODIMENT

The improved heavy-duty energy absorbing bumper mount is indicated generally at 1 (FIG. 3) and shown partially mounted on a frame member 2 of a vehicle and serving as a mount for a bumper 3, a portion of which is shown in dot-dash lines. The bumper mount 1 includes a box-like housing 4, shown in unassembled condition in FIG. 1. Housing 4 includes a pair of generally channel-shaped members 5 and 6 having top walls 7 and 8, bottom walls 9 and 10, and side walls 11 and 12, respectively.

Top and bottom walls 7 and 9 of member 5 preferably are wider than top and bottom walls 8 and 10 of member 6, and are telescopically received between walls 8 and 10 (FIG. 7) and are secured by welds 13 when fully assembled as shown in FIG. 3.

The rear edges 14 of walls 8 and 10 of member 6 are notched at 14a to align with rear edges 15 of walls 7 and 9 of member 5 when assembled, the purpose of which is discussed below.

Side walls 11 and 12 are formed with a plurality of horizontally aligned assembly alignment holes 16. Anti-pull-out pin receiving apertures 17 are formed adjacent the open front end of housing 4. Side wall 11 of channel member 5 preferably is longer in the longitudinal rearward direction than side wall 12 of member 6 to provide sufficient size for mounting bumper mount 1 on vehicle frame 2.

Side wall 11 is formed with a plurality of holes 18 surrounded by collars 18a (FIG. 9) for receiving threaded stake bolts 19 therein. One such bolt 19 is located in the generally pointed rear end 20 of side wall 11, and the remaining two stake bolts 19 are vertically aligned and located generally intermediate the open ends of housing 4.

Bolts 19 and collars 18a extend through openings 2a formed in vehicle frame member 2 for attaching the bumper mount 1 thereon by washers 22 and nuts 23, as shown in FIG. 9.

The bumper mount 1 also includes a generally H-shaped elongated beam-like member 25 (FIG. 2) having two channel members 26 and 27, which may be formed from flat plates of steel or the like. Channels 26 and 27 preferably are welded together at various zones by welds 28 (FIG. 8) with the outer channel end portions being welded at 28a to a bumper mounting plate 29. The mating webs 30a and 30b of channels 26 and 27 form the web 30 of H-beam 25 which extends vertically in a usual bumper mounting position.

The top and bottom flanges 31 and 32, respectively, of H-beam 25 (FIGS. 2 and 7) are formed by the horizontally aligned flanges 31a–31b and 32a–32b of channels 26 and 27. Flanges 31 and 32 generally have a configuration in vertical section complementary to the configuration of the top and bottom housing walls 7–8 and 9–10. The top and bottom beam flanges 31 and 32 extend horizontally with respect to beam web 30, in cross section, at any section, as shown in FIGS. 4, 7 and 8.

Ramp formations 33 and 34 are formed on the rear end portions of top and bottom channel flange members 31 and 32, respectively, and in assembled position engage housing rear edges 14 and 15.

Pairs of energy absorbing rubber pads or blocks 36 and 37 are bonded to each side of web 30 of H-beam 25 and to the inner surfaces of housing side walls 11 and 12 respectively, preferably by an adhesive and in a manner described below.

In accordance with the invention a longitudinally extending slot 38 is formed in beam web 30 and extends from adjacent the front end of beam 25 rearwardly toward the center portion of beam 25. Slot 38 preferably is located centrally of top and bottom beam flanges 31 and 32.

Also in accordance with the invention an anti-pull-out pin 39 extends through housing side wall apertures 17 and through slot 38, and is connected to side walls 11 and 12 by welds 40 (FIG. 7). The vertical width of slot 38 preferably is slightly greater than the thickness of pin 39 to provide a loose fit between pin 39 and the outer edges of slot 38, the purpose of which is discussed below.

Rubber pads 36 and 37 during final assembly of bumper mount 1 are prestressed or preloaded in the direction of arrow 41, FIG. 3, so that at no-load position, as shown in FIGS. 3 and 5, ramp formations 33 and 34 pressingly engage housing rear edges 14 and 15 preventing rattle between beam 25 and housing 4. Anti-pull-out pin 39 is at the rear end of slot 38 engaged with beam web 30 when in such no-load or normal condition.

Bumper mount 1 is assembled easily by placing the pairs of rubber pads 36 and 37 in channel members 5 and 6 of housing 4 and in channel members 26 and 27 of beam 25. Proper alignment and positioning of pads 36 and 37 within housing 4 may be achieved easily by use of alignment pins which extend through alignment holes 16 and 42 in housing side walls 11 and 12 and beam web 30, and through similar alignment holes 43 in rubber pads 36 and 37. A suitable adhesive is applied to the side surfaces of rubber pads 36 and 37 for bonding to housing side walls 11 and 12 and beam web 30.

The loosely assembled bumper construction then is pressed in a transverse direction until approximately a 10 percent compression is achieved. The alignment pins are removed and housing top and bottom walls 7-8 and 9-10, respectively, are then welded at 13 forming housing 4. This partially assembled bumper mount then is placed in an oven and heated at a predetermined temperature for a predetermined time to achieve proper bonding between the adhesive on rubber pads and the respective housing and beam members.

Rubber pads 36 and 37 then are prestressed or preloaded in the direction of arrow 41, FIG. 3, during which prestressing anti-pull-out pin 39 is inserted through aperatures 17 and slot 38 and welded at 40 to housing side walls 11 and 12. Ramps 33 and 34 are bent outwardly to their final shape until contacting housing edges 14 and 15 to insure firm metal to metal contact at no-load condition, at which condition pin 39 engages beam web 30 at the rear of slot 38 as shown in FIG. 5.

Such prestressing or preloading holds ramps 33 and 34 tightly against housing 4 preventing rattle between H-beam 25 and housing 4, and holds pin 39 tightly against web 30 at the rear of slot 38. This final at-rest or no-load assembled condition is shown in full lines in FIGS. 3 and 5 and partially in dot-dash lines in FIGS. 9 and 10.

FIGS. 9 and 10 illustrate in full lines the fully retracted position of the bumper components upon impact. When the bumper 3 is subjected to impact, the H-beam 25 moves longitudinally rearwardly within housing 4 in the direction of arrow 44, causing distortion of the energy absorbing rubber pads 36 and 37 as shown in FIG. 9, and placing shear stress on the rubber pads, in a manner fully described in U.S. Pat. No. 3,722,939.

Beam 25 is prevented from moving longitudinally rearwardly beyond the fully retracted full line impact position of FIGS. 9 and 10 by engagement of pin 39 with beam web 30 at the front end of beam slot 38.

When a vehicle is towed from a towing vehicle through a towing connection with a bumper 3 mounted with the improved bumper mount construction 1 on the front or rear of one of the vehicles, the force or load encountered during towing or at the start of a towing operation, cannot pull H-beam 25 out of housing 4 in a direction opposite to that of the arrow 41 in FIG. 3. Such pull-out is prevented by pin 39 engaging beam web 30 at the rear of slot 38 and not by ramp formations 33 and 34 engaging housing rear edges 14 and 15 as in copending application Ser. No. 290,484. Such ramp formations are satisfactory to prevent beam pull-out for light vehicles such as automobiles, but a construction able to resist greater pull-out forces as does pin 39, is desirable for heavy vehicles, such as motor homes, etc.

Ramps 33 and 34 being continually pressed against edges 14 and 15 of housing 4 by the preloading of pads 36 and 37 prevent rattle without the need of installing compression pads or other sound deadening material at the point of contact between beam 25 and housing 4.

The amount of preload applied to the assembly, as shown in FIGS. 3 and 5 by the concavities 45 and convexities 46 at the ends of pads 36 and 37, preferably is approximately 5 percent of the total stroke of H-beam 25.

The preloaded anti-pull-out energy absorbing bumper mount construction operates effectively for mounting rear bumpers on a vehicle which is towing another vehicle, or for mounting a front bumper on a vehicle which is being towed.

Furthermore, the improved arrangement maintains the metal beam and housing members in spaced relation except for the small contact area between ramps 33 and 34 and housing edges 14 and 15 so that they cannot jam and so that rust and corrosion cannot impair the effectiveness of the energy-absorbing and anti-pull-out properties of the construction.

The vertical spacing indicated at 47 (FIG. 5) between beam flanges 31 and 32 and housing walls 7 and 9 is approximately equal to spacings 48 between pin 39 and the edges of slot 38. This equal spacing permits vertical loads applied to H-beam 25 to be absorbed partially by pin 39 and partially by walls 7-8 and 9-10 without undue stress being placed on either pin 39 or the walls of housing 4.

The generally rectangular outer shape of each beam 25 in cross-section, as well as the rectangular cross-sectional shape of housing 4 in which the H-beam is telescoped (FIGS. 7 and 8), prevent relative rotation of H-beam 25 with respect to housing 4 along the longitudinal axis of H-beam 25. Furthermore, the horizontal disposition of the top and bottom walls 7-8 and 9-10 of housing 4 and of flanges 31 and 32 of H-beam 25 enable vertical loads to which the bumper may be subjected to be transmitted directly from the H-beam flanges to the top and bottom walls of housing 4. Thus, the new construction retains the advantageous features of the energy-absorbing bumper mount constructions of U.S. Pat. No. 3,722,939 and copending application Ser. No. 290,484.

The preloading of the assembled components of the improved heavy-duty bumper mount preferably is approximately 5 percent of the total stroke of the H-beam. The amount of preloading, however, may vary between say, 2 percent to 10 percent depending on the particular bumper, type of vehicle, etc., involved. The important consideration of this aspect of the invention is that a preload is established between the energy absorbing rubber pads 36 and 37, H-beam 25 and housing 4 so that ramps 33 and 34 and pin 39 are maintained under sufficient pressure against housing edges 14 and 15 and web 30. This force avoids any rattling contact between metal-to-metal components of the bumper mount assembly under no-load conditions eliminating the need for additional sound deadening pads or the like.

Accordingly, the present invention provides a heavy-duty bumper mount construction which prevents pull-out separation of components of the bumper mount incident to subjecting a bumper mounted on the improved construction to a pulling force, as when towing a vehicle connected with the bumper so described; provides a bumper mount construction satisfying the described anti-pull-out requirement with anti-rattle ramp formations cooperatively associated with the anti-pull-out and the energy-absorbing components; provides a construction in which the energy-absorbing means are preloaded to establish the anti-rattle characteristics in the at-rest or normal position of the mount components; provides a construction which enables convenience and safety features for the vehicle to be retained for energy-absorbing bumper mounts which may be used in a wide variety of models and styles of extremely heavy vehicles, such as motor homes, etc.; provides a construction which is rugged and which has simple stamped metal components and which is easily and economically manufactured; and provides a construction satisfying the described objectives, achieving new results and solving problems and satisfying needs which have existed in the art.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and is not limited to the exact details of the construction shown or described.

Having now described the features, discoveries and principles of the invention, the manner in which the heavy-duty bumper mount construction may be made, the characteristics of the new construction, and the advantageous, new and useful results obtained; the new and useful structures, devices, elements, arrangements, parts and combinations are set forth in the appended claims.

We claim:

1. In vehicle energy absorbing bumper mount construction of a type including an elongated housing having top and bottom walls and opposite side walls and open at front and rear ends, an elongated beam of generally H-shaped cross section located within the housing, and having a web portion spaced between the opposite housing side walls, and top and bottom flanges spaced closely adjacent to the housing top and bottom walls respectively, a front portion of the H-beam extending outward from the housing interior from the front open end of the housing, the rear end of the H-beam being located adjacent to the rear open end of the housing, and energy absorbing elastic members bonded to opposite surfaces of the web portion and connected to the housing side walls to hold the H-beam within the housing; the combination of the housing top and bottom walls having rear edges which form part of the housing open rear end; ramp formations being formed on the rear end of at least one of the H-beam top and bottom flanges; longitudinally extending slot means formed in the H-beam web portion; anti-pull-out pin means mounted on and extending transversely between the housing side walls and through said slot means preventing the H-beam from being pulled out of the front end of the housing; and the elastic members being prestressed to hold the pin means engaged with the beam web at the rear end of the slot means, and to hold the ramp formations in contact against the housing top and bottom wall rear edges located adjacent said ramp formations to prevent rattle between the H-beam and housing when the H-beam is in usual no-load condition.

2. The construction defined in claim 1 in which the slot means has top and bottom defining edges; in which the pin means is spaced from said top and bottom slot means edges; and in which the spacing between the top and bottom H-beam flanges and the housing top and bottom walls is approximately equal to said spacing between the pin means and said slot means top and bottom defining edges.

3. The construction defined in claim 1 in which a pair of transversely aligned openings are formed in the housing side walls adjacent the open front housing end; and in which the pin means is engaged in said openings and is fixed to said side walls.

4. The construction defined in claim 1 in which a plurality of horizontally aligned holes are formed in the housing side walls, H-beam web portion, and in the elastic members and in which alignment pin means are removably inserted in said aligned holes to properly align said elastic members, housing side walls and H-beam during assembly of the bumper mount construction.

* * * * *